June 30, 1964  A. U. HAANES  3,139,008
RECIPROCATORY PNEUMATIC MOTOR
Filed April 27, 1960  3 Sheets-Sheet 1
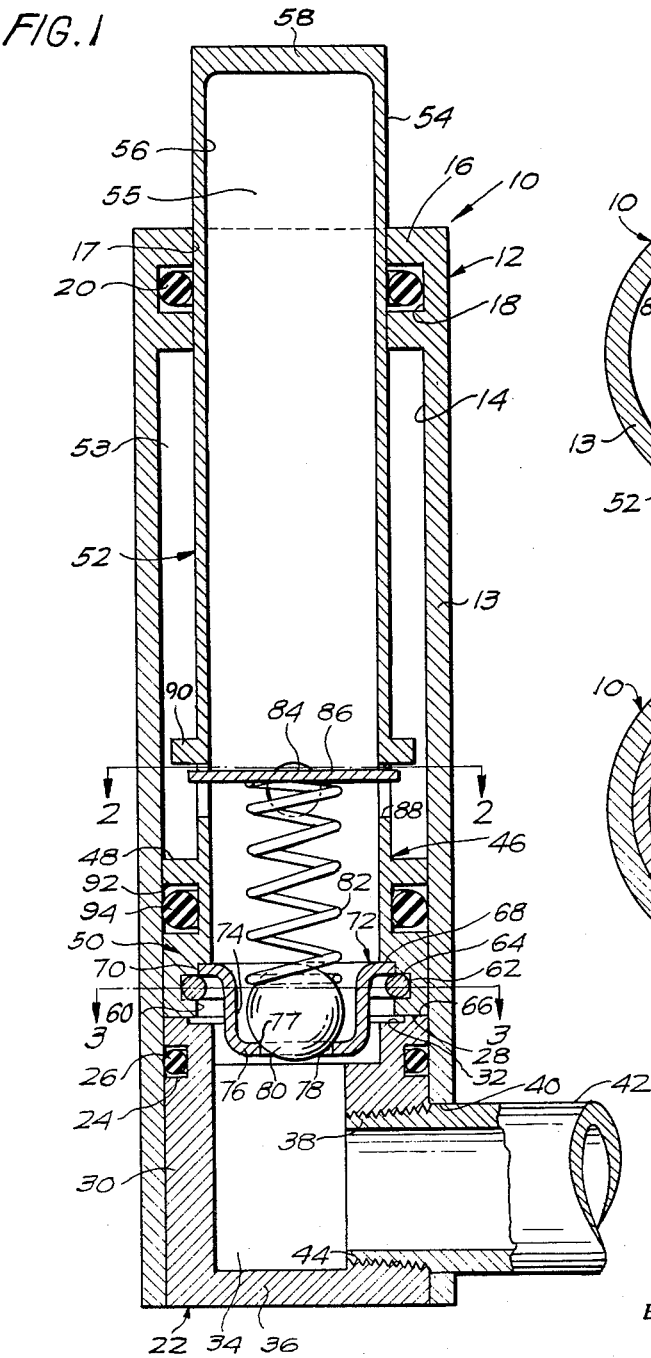
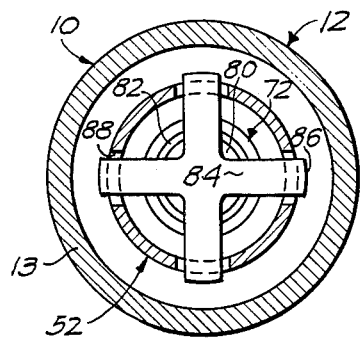
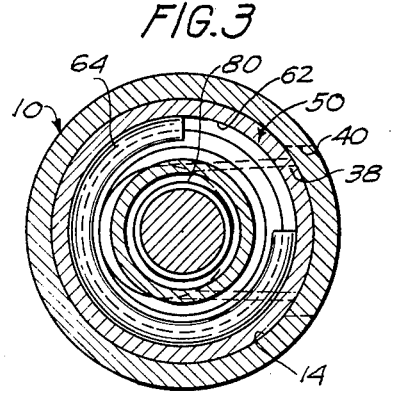
INVENTOR.
ARNT U. HAANES
BY Barthel & Bugbee
ATTORNEYS June 30, 1964  A. U. HAANES  3,139,008
RECIPROCATORY PNEUMATIC MOTOR
Filed April 27, 1960  3 Sheets-Sheet 2
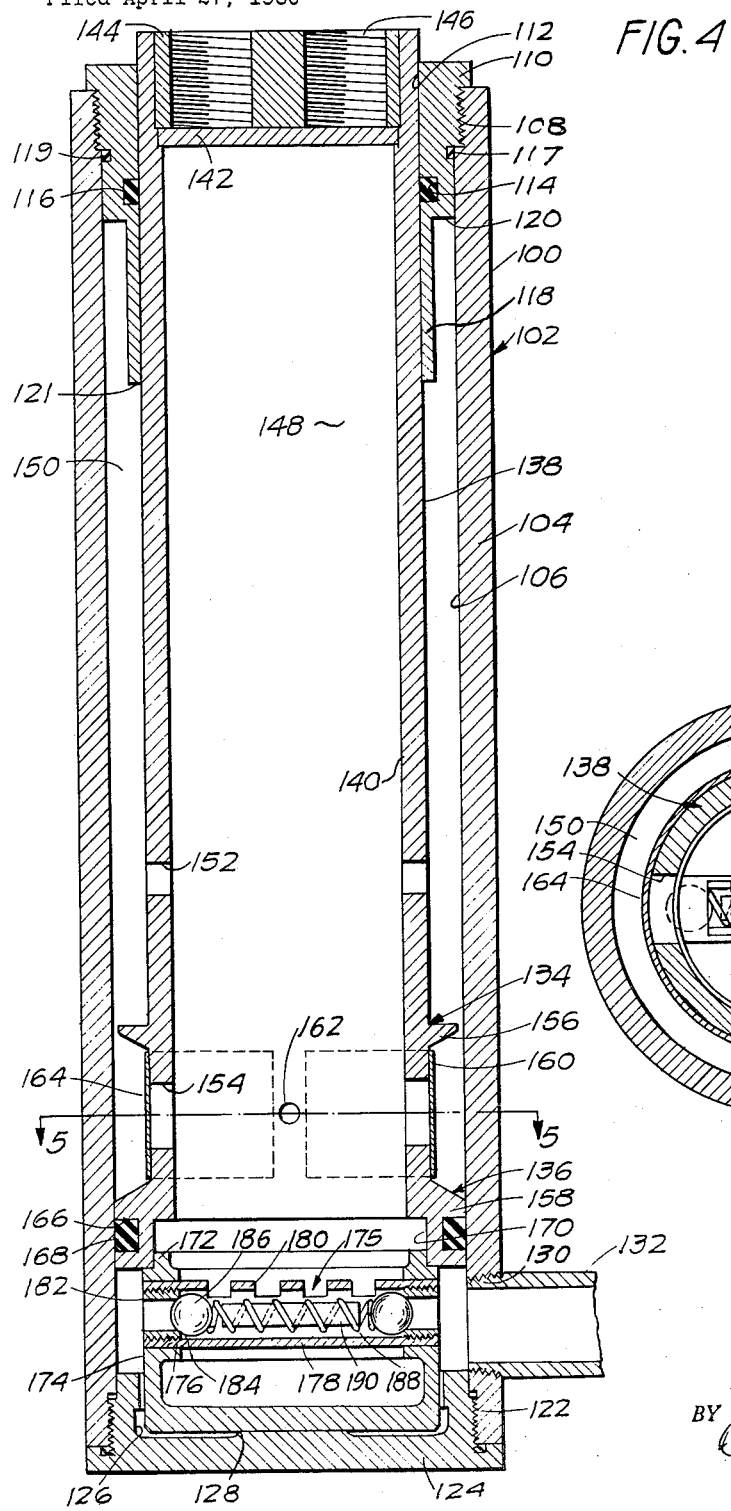
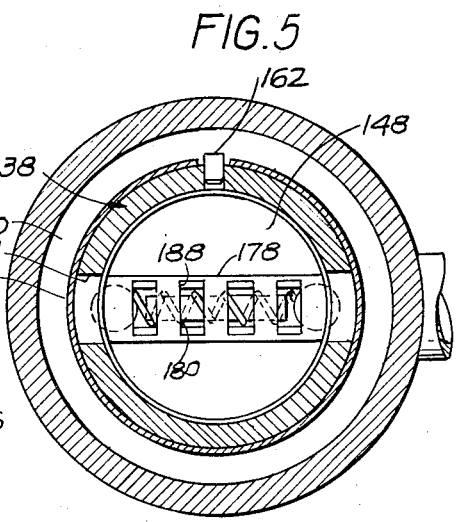
INVENTOR.
ARNT U. HAANES
BY Barthel & Bugbee
ATTORNEYS INVENTOR.
ARNT U. HAANES
BY
Barthel & Bugbee
ATTORNEYS __United States Patent Office__ 3,139,008
Patented June 30, 1964

3,139,008
RECIPROCATORY PNEUMATIC MOTOR
Arnt U. Haanes, 522 S. Laurel Ave., Royal Oak, Mich.
Filed Apr. 27, 1960, Ser. No. 24,995
7 Claims. (Cl. 91—416)

This invention relates to reciprocatory fluid pressure motors and, in particular, to reciprocatory fluid pressure motors with pneumatic return.

One object of this invention is to provide a pneumatically-returned reciprocatory fluid pressure motor with self-contained return pneumatic fluid which replaces the ordinary double-acting reciprocatory fluid pressure motors with their additional piping and four-way valve arrangements, thereby adapting the motor of the present invention to be mounted in restricted spaces having inadequate provision for a conventional double-acting reciprocatory fluid pressure motor with its required additional piping.

Another object is to provide a pneumatically-returned reciprocatory fluid pressure motor of the foregoing character which by reason of its novel construction also eliminates the bulky and fragile springs used to actuate the return strokes of the pistons in spring-returned motors, which pistons tend to slow down as the spring is compressed on the forward or working stroke, and also requires only a three-way control valve instead of the four-way control valve required for the conventional double-acting reciprocatory fluid pressure motor.

Another object is to provide a pneumatically-returned reciprocatory fluid pressure motor of the foregoing character wherein the pneumatic return chamber is within the cylinder of the motor itself so as to constitute a self-contained return air supply, thereby eliminating the safety switches and other external parts presently used for safety reasons in the circuits of prior reciprocatory motors employed to eject workpieces from a die, and required for preventing die closing while the piston rod of the motor is in the die and consequent failure of air pressure suddenly cuts off return air pressure.

Another object is to provide a pneumatically-returned reciprocatory fluid pressure motor of the foregoing character wherein the self-contained air supply for the piston return arrangement is provided from the source of operating compressed air and controlled by a spring-pressed valve which is self-contained within the motor and which is mounted within the piston of the motor and moves not only therewith but also relatively thereto during replenishment of return air supply.

Another object is to provide a pneumatically-returned reciprocatory fluid pressure motor as set forth in the object immediately preceding wherein the spring characteristics are so chosen as to cause the valve to seat before the return pressure inside the piston of the motor equals the incoming pressure of the compressed air or other operating fluid, thereby minimizing the opposition of the return air to the operating air during the working stroke of the piston.

Another object is to provide a pneumatically-returned reciprocatory fluid pressure motor as set forth in the two objects immediately preceding, wherein the valve opens immediately against the pressure of a light spring and remains open so as to provide a feedback of pressure fluid which prevents an accumulation of excessive pressure within the return fluid pressure chamber.

Another object is to provide a pneumatically-returned reciprocatory fluid pressure motor as set forth in the three objects immediately preceding wherein the spring-pressed valve enables the motor to be mounted in any desired position, even inverted, without permitting the force of gravity to alter or interfere appreciably with its operating characteristics.

Other objects and advantages of the invention will become apparent during the course of the following description of the accompanying drawings, wherein:

FIGURE 1 is a central longitudinal section through a pneumatically-returned reciprocatory fluid pressure motor with self-contained return, according to one form of the invention, as especially adapted for installations requiring small cylinders;

FIGURE 2 is a cross-section taken along the line 2—2 in FIGURE 1, showing the valve spring abutment construction;

FIGURE 3 is a cross-section taken along the line 3—3 in FIGURE 1, showing the construction in the vicinity of the valve and intake end of the cylinder;

FIGURE 4 is a central longitudinal section through a modified pneumatically-returned reciprocatory fluid pressure motor with a self-contained return adapted for medium duty installations requiring a medium volume of return pneumatic fluid;

FIGURE 5 is a cross-section taken along the line 5—5 in FIGURE 4, showing details of the pressure-regulating valve in the piston;

Figure 6:
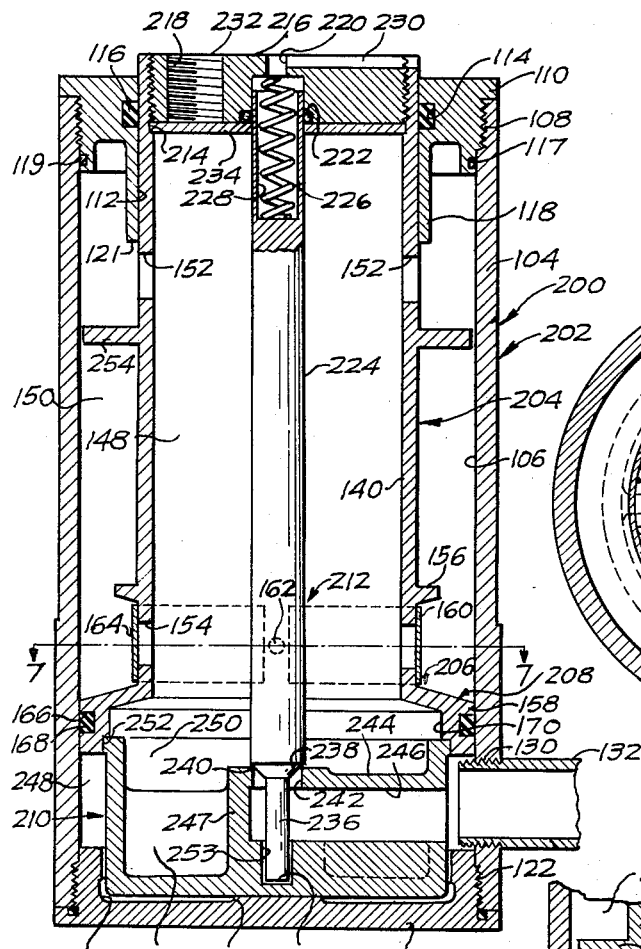
FIGURE 6 is a central longitudinal section through a further modified pneumatically-returned reciprocatory fluid pressure motor adapted for heavy duty installation requiring a large volume of return pneumatic fluid with a minimum of pressure change during the forward or working stroke of the piston.

Hitherto, so-called double-acting reciprocatory fluid-pressure motors have been used in many installations and machines for moving a part to and fro positively in opposite directions by alternately supplying pressure fluid to the opposite sides of the piston of such a motor by supplying from external sources such pressure fluid to the opposite ends of the cylinder in which the piston reciprocates, the directional control of the pressure fluid being obtained by means of a conventional four-way valve. In many installations, however, the space is constricted so as to be inadequate for all of the piping required for the supply and exhaust of air to and from the opposite ends of a coventional double-acting cylinder. In other installations, while such space is available, the presence of all of these pipes interferes with the efficient use of the die assembly or other tool upon which the motor is mounted. One such installation, used by way of example but not of limitation, is that of the reciprocatory fluid pressure motor or motors mounted in or on a die set for moving a so-called "gauge" or workpiece-locating stop into and out of workpiece-engaging position. In such a die assembly, the available space for such motors is at times restricted. Where double-acting reciprocatory fluid pressure motors are used in such an installation, the multiplicity of pipes necessary for such motors occupy so much space, complicate the installation and reduce the amount of room available for other mechanism required, as well as interfering with the efficient operation of the die assembly.

Furthermore, prior reciprocatory motors with spring-returned pistons also have been necessarily bulky because of the fact that a considerable length of spring beyond the stroke of the piston is required in order to furnish enough residual spring thrust at the end of the return stroke of the piston to completely return the piston to its starting position. Such a spring must also be of much greater length than the piston stroke in order that its thrust will not change excessively during the stroke of the piston.

The present invention provides a pneumatically-returned reciprocatory fluid pressure motor with self-contained return air supply which eliminates these disadvantages of prior double-acting and spring-returned fluid pressure motors in the manner set forth in the foregoing objects.

Referring to the drawings in detail, FIGURES 1 to 3 inclusive show a self-contained pneumatically-returned reciprocatory fluid pressure motor, generally designated 10, according to one form of the invention as provided with a cylinder 12 having a cylindrical side wall 13 containing a cylinder bore 14. The upper end of the cylinder bore 14 is closed by an annular integral end wall 16 containing a cylindrical bore 17 and an annular recess 18 having a leakage-preventing sealing ring 20, such as an O-ring or a quad-ring, of elastic deformable material mounted therein, such material being, for example, natural or synthetic rubber or synthetic plastic or compounds thereof. The cylinder bore 14 is preferably of cylindrical shape.

The lower end of the cylinder bore 14 is closed by a cup-shaped removable cylinder head 22 fitted snugly therein and annularly grooved at 24 to receive a conventional sealing ring 26 similar to the sealing ring 20 and for the similar purpose of preventing leakage. The annular upper end surface 28 of the approximately cylindrical side wall 30 of the cylinder head 22 serves as a stop surface and has an annular recess 32 therein leading to a cup-shaped recess 34, the lower end of which is closed by the disc-shaped end wall 36 of the cylinder head 22. The side wall 30 of the cylinder head 22 is provided with a threaded radial port 38 which registers with a smooth port 40 in the cylindrical side wall 13. A pressure fluid supply pipe 42 is inserted through the smooth port 40 and has a threaded end portion 44 threaded into the threaded bore 38 in the cylinder head side wall 30, thereby also acting as a coupling member for holding the cylinder head 22 in the open end of the cylinder bore 14. In this manner, the need for separate coupling pins, screws or the like is eliminated. The frictional grip exerted by the sealing ring 26 upon the cylinder bore 14 holds the cylinder head 22 in assembly with the cylinder 12 during the positioning of the motor 10 in the bore or recess in which it is mounted in a die or other support while the pipe 42 is being inserted through the smooth port 40 and threaded into the threaded port 38.

Reciprocably mounted in the cylinder bore 14 (FIGURE 1) is a piston, generally designated 46, which in turn consists generally of a piston head 50 with an annular upper or inner surface 48 between it and a hollow tubular piston rod 52 which forms an outer return air chamber 53 between its outer surface 54 and the bore 14. The rod 52 passes snugly but slidably through the bore 17 and is snugly but slidably engaged by the sealing ring 20 to prevent leakage between the cylindrical outer surface 54 of the hollow piston rod 52 and the bore 17 in the cylinder end wall 16. The hollow piston rod 52 contains an inner return air storage chamber 55 formed by a cylindrical bore 56 closed at its upper end by an end wall 58. The bore 56 extends into and through the piston head 50, where it opens into an annular counterbore 60 near the lower end of the piston head 50.

The counterbore 60 in the lower end portion of the piston head 50 contains an annular groove 62 in which is seated a valve seat retaining snap ring 64 of spring steel or other suitable resilient material. The annular lower end 66 of the piston head 50 engages the annular stop surface 28 on the upper end of the piston head side wall 30. Seated in the counterbore 60 and held against the annular shoulder 68 between the bore 56 and counterbore 60 by the snap ring 64 is the annular rim 70 of a cup-shaped piston head member 72 having a cylindrical side wall portion 74 extending toward the port 38 into the recess 34 of the cylinder head 22. The side wall portion 74 at its lower end terminates in an end wall 76 containing a valve port 78 with a valve seat 77 on its upper end.

Seated in the piston head member 72 on the valve seat 77 to open and close the port 78 is a movable valve member 80 preferably in the form of a ball and urged against the valve seat 77 into closing engagement therewith by a compression spring 82. The compression spring 82 is coaxial with the hollow piston rod 54. The spring 82 is preferably selected with such characteristics as to urge the ball valve member 80 into closing engagement with its seat 77 at a slightly lower pressure in the air chambers 53 and 55 than the incoming air pressure within the cylinder head recess 34. The upper end of the spring 82 engages a cross-shaped resilient spring abutment 84 having arms 86, the ends of which extend into ports 88 located at 90 degree intervals around the periphery of the hollow piston rod 52 immediately adjacent an annular stop flange 90. The spring abutment 86 is made of resilient material, such as spring steel, so that it may be inserted by pushing it through the counterbore 60 into the lower end of the piston rod bore 56, pushing it inward with the arms 86 bowed into accurate form until they reach the ports 88 and snap into them in the manner shown in FIGURES 1 and 2. The piston head 50 is provided with an annular peripheral groove 92 containing a leak-preventing sealing ring 94 similar to those described above.

In the operation of the pneumatically-returned reciprocatory fluid pressure motor 10 (FIGURE 1), let it be assumed that the pressure fluid supply pipe 42 has been inserted in couping engagement with the cylinder head 22 through the smooth port 40 in the cylinder wall 13, as described above, and that the pipe 42 has been connected to a suitable source of supply of compressed air or other compressible fluid by way of a conventional three-way control valve (not shown). Such a valve, when shifted into one position, connects the pipe 42 to the source of compressed pressure fluid and in its other position vents the pipe 42 to the atmosphere. The pressure of the incoming compressed air or other compressed gas entering through the pipe 42 into the incoming air chamber 34 pushes upward on the ball valve member 80 and lifts it off its seat, causing air to flow through the port 78 into the inner return air storage chamber 55, and thence through the ports 88 into the outer return air chamber 53. The inner return air storage chamber 55 provides a large volume of return air which constantly supplies the outer air chamber 53 and at the same time prevents excessive rise of pressure within the outer return air chamber 53 during the forward stroke of the piston 46, as described below. The air in the chambers 53 and 55 increases in pressure until this pressure, amplified by the pressure of the spring 82, forces the ball-shaped valve member 80 to close against the seat 77.

Further entry of compressed gas into the chamber 34 in the cylinder head 22 forces the piston head 50 of the piston rod 46 upward, causing the end wall 58 of the piston rod 52 to move upward, together with the parts which it engages and is intended to operate, until the stop flange 90 engages the end wall inner surface 16 to halt the further motion of the piston 46 and thereby limit its stroke.

To retract the piston 46, the operator shifts the conventional three-way control valve (not shown) to its venting position so as to connect the pressure pipe 42 and valve head chamber 34 to the atmosphere. The release of compressed air or other compressed gas from the incoming air chamber 34 immediately causes the compressed gas within the outer return air chamber 53 to act against the inner end wall 48 of the piston head 50 and forces it away from the cylinder end wall 16 toward the cylinder head 22, retracting the piston 46. Retraction occurs until the outer end 66 of the piston head 50 engages the stop surface 28 on the cylinder head 22, and the parts come to rest in the positions shown in FIGURE 1.

*Modified Pneumatically-Returned Reciprocatory Fluid Pressure Motor*

The modified pneumatically-returned reciprocatory fluid pressure motor, generally designated 100, shown in FIGURES 4 and 5 is adapted for use in installations requiring a larger motor than the motor 10 shown in FIGURES 1 to 3 inclusive. The motor 100 is provided with a cylinder 102 having a cylinder side wall 104 with a bore 106 therein. The upper end of the bore 106 contains a threaded counterbore 108 in which is mounted an externally-threaded closure bushing 110 containing a bore 112 with an internal groove 114 in which is mounted a packing 116 for preventing leakage. The closure bushing 110 also contains an external groove 117 with a leakage-preventing packing 119 therein. The bushing 110 has an elongated skirt 118 spaced apart from the cylinder bore 106 by an annular shoulder 120 and extending downwardly therein to an annular stop surface at its lower end 121.

The lower end of the cylinder bore 106 also contains an internally-theaded counterbore 122 (FIGURE 4) into which is threaded an externally-threaded cup-shaped cylinder head 124 containing a cup-shaped recess 126 with a central stop boss 128. The cylinder side wall 104 near its lower end immediately above the threaded counter bore 122 contains an inlet port 130 which is internally-threaded to receive the correspondingly threaded end of a pressure fluid supply pipe 132. The latter is connected to a suitable source of compressible pressure fluid, such as compressed air, by way of a conventional three-way valve of the type described above in connection with the reciprocatory fluid pressure motor 10 of FIGURES 1 to 3 inclusive.

Reciprocably mounted in the cylinder 102 in the cylinder bore 106 is a hollow piston, generally designated 134, consisting generally of a piston head 136 and hollow tubular piston rod 138. The latter snugly but slidably passes through and engages the bore 112 in the closure bushing 110 and has a central bore 140 counterbored at its upper end to receive a closure disc 142 and a closure plug 144 secured therein in any suitable way, as by welding. The closure plug 144 is provided with threaded holes 146 for the reception of bolts, screws, threaded rods or other means for attachment of the parts intended to be moved and operated by the reciprocation of the piston 134 of the motor 100. The hollow piston rod 138 divides the interior of the cylinder 102 into an inner return air storage chamber 148 and an outer return air chamber 150 interconnected by open intermediate ports 152 and by valved lower or inner ports 154.

Adjacent the ports 154 on the side thereof toward the ports 152 is an annular flange 156 projecting outwardly from the piston rod 138 almost to the cylinder bore 106 and forming, with a piston head flange 158 at the lower end thereof, an annular recess 160 surrounding the portion of the piston rod 138 containing the ports 154 and drilled to receive a stop pin 162. Mounted in the annular recess 160 in closing engagement with the valved ports 154 is a split annular valve band 164 of spring steel or other suitable resilient material and of interrupted hollow cylindrical form with its ends separated from one another by the stop pin 162, which prevents rotation of the valve band 164.

The piston head flange 158 is externally-grooved at 166 to receive a leak-preventing packing 168 and is internally counterbored at 170. Welded or otherwise secured in the counterbore 170 is the upwardly or axially-projecting attachment flange 172 of the cup-shaped central piston head member 174. The latter, in cooperation with the flange 158, constitutes the piston head 136. In order to receive a return pressure-regulating valve, generally designated 175, the central piston head member 174 (FIGURE 4) is bored transversely as at 176 to receive the opposite outer ends of a tubular valve casing 178 having multiple spaced ports 180 in its upper side wall. The opposite ends of the tubular valve casing 178 are internally-threaded to receive correspondingly-threaded tubular closure bushings 182, the inner ends 184 of which form valve seats for ball valve members 186. The valve members 186 are urged against their respective seats 184 by a helical compression spring 188 coiled around a spring-retaining rod 190. From FIGURE 4 is will be seen that a slight clearance exists between the cup-shaped recess 126 of the cylinder head 128 and the central piston head member 174 so as to permit pressure fluid to flow into the end space surrounding the stop boss 128. The spring 188 is chosen with such characteristics as to close the ball valve members 186 against their respective seats 184 when the pressure within the return air chambers 148 and 150 is slightly lower than that of the incoming air.

In the operation of the modified pneumatically-returned reciprocatory fluid pressure motor 100 of FIGURES 4 and 5, pressure fluid such as compressed air is admitted by way of the conventional three-way control valve (not shown) and pipe 132 through the port 130 into the recess 126 in the cylinder head 124 and also through the closure bushings 182 where it forces the ball valve members 186 inward by overcoming the thrust of the compression spring 188 to permit air or other pressure fluid to flow through the ports 180 into the inner return air storage chamber 148 and thence through the ports 152 and 154 into the outer return air chamber 150. When the ports 152 in the outwardly-moving tubular piston rod 138 are closed by passing the end 121 of the skirt 118, the pressure of the pressure fluid in the lower end of the return air chamber 150 below the ports 152 is cut off from communication with that in the return air storage chamber 148. If, however, leakage has occurred from the return air chamber 150 so as to reduce the pressure therein, the higher pressure in the chamber 148 then forces the valve band 164 to spring radially outward from its closing position of the valved ports 154 shown in FIGURE 4 into an open position permitting flow therethrough into the outer return air chamber 150.

When the pressure in the inner and outer return air chambers 148 and 150 reaches an amount slightly less than the pressure of the incoming air, the return air pressure, amplified by the force of the compression spring 188, urges the ball valve members 186 into closing engagement with their respective seats 164, entrapping the return air or other pressure fluid within the return air chambers 148 and 150. The inner return air storage chamber 148 provides a large volume of return air which constantly supplies the outer air chamber 150 and at the same time prevents excessive rise of pressure within the outer return air chamber 150 during the forward stroke of the piston 134, as described below.

Further entry of pressure fluid through the pipe 132 into the recess 126 in the cylinder head 124 acts against the lower end of the central piston head member 174 and against the lower side of the piston head flange 158 to move the piston head 136 and tubular piston rod 138 upward, causing the piston 134 to actuate the parts intended to be operated, through the threaded connections 146 therewith in the end closure plug 144. When the piston 134 reaches the limit of its upward stroke, it is halted by the engagement of the flange 156 with the lower end 121 of the skirt 118. Meanwhile, free intercommunication between the inner and outer return air chambers 148 and 150 has been cut off when the ports 152 pass into the skirt 118, pressure in the outer chamber 150 normally holding the valve band 164 closed over the ports 154. This causes air compression to cushion the forward or working stroke of the piston. To retract the piston 134, the operator shifts the conventional three-way valve (not shown) to its venting position, thereby connecting the recess or chamber 126 at the lower end of the cylinder bore 106 with the atmosphere, through the port 130 and pipe 132. The consequent escape of pressure fluid from the space below the piston head 136 permits the compressed return air within the return air chamber 150 to act against the annular outer portion of the piston head 136 located within the return air chamber 150 and force it downward into its retracted position shown in FIGURE 4. Meanwhile, as before, if at any time after the ports 152 have passed into the skirt 118, any leakage of air from the return air chamber 150 which reduces the pressure therein causes the valve 164 to be forced open by the higher pressure in the storage chamber 148, thereby restoring the pressure in the chamber 150.

*Further Modified Pneumatically-Returned Reciprocatory Fluid Pressure Motor*

Figure 7:
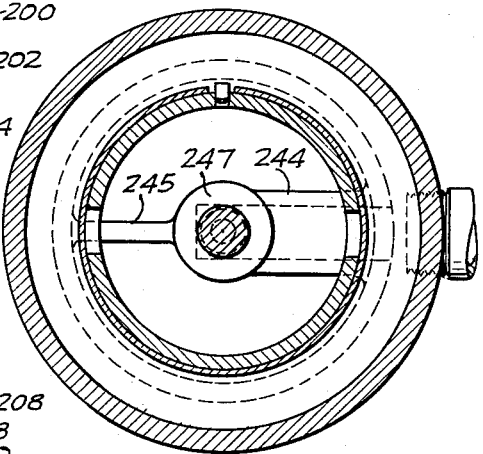
FIGURE 7 is a cross-section taken along the line 7—7 in FIGURE 6, showing the reservoir supply feedback valve and check valve dashpot construction.

The further modified pneumatically-returned reciprocatory fluid pressure motor, generally designated 200, shown in FIGURES 6 and 7 is suitable for installations having a large piston return surface area, thus requiring a large volume of return air which would cause high compression of air trapped in the chambers 148 and 150 and greatly cut down the effectiveness of the forward stroke of the piston. The further modified motor 200 is so similar in most respects to the modified motor 100 of FIGURES 4 and 5 that corresponding parts, differing only in dimensions, are designated with the same reference numerals, in order to avoid needless repetition of description.

The motor 200 has a cylinder 202 of substantially identical construction to the cylinder 102 of the motor 100 of FIGURE 4, and the tubular piston rod 204 of the piston 206 is also generally similar in construction to the piston rod 138 of the piston 134. The piston head 208, however, differs somewhat in the construction of the piston head member 210 from that of the piston head member 174, and the upper end of the piston rod 204 is closed in a slightly different manner. A return pressure-regulating valve, generally designated 212, also differs in construction from that of the pressure-regulating valve 175 of FIGURES 4 and 5.

In particular, the upper end of the bore 140 within the tubular piston rod 204 is counterbored and threaded internally as at 214 to receive an externally-threaded closure plug 216 containing one or more threaded holes 218 for the reception of bolts, rods or screws for connecting the piston rod 204 to the parts to be operated (not shown). The center of the plug 216 is provided with a hole 220 leading into a bore 222 in which is slidably mounted the upper end of the valve rod 224 and urged downward by a compression spring 226 mounted in a socket 228 in the upper end of the valve rod 224. The lower end of the spring 226 engages the bottom of the socket 228 and its upper end engages the annular shoulder between the bore 222 and hole 220. The spring 226 is chosen with similar characteristics to the springs 82 and 188 described above. A groove 230 leads from the hole 220 to the edge of the plug 216 for providing a vent for the air within the bore 222 particularly when the operated parts (not shown) are bolted or otherwise secured snugly against the top surface 232 of the plug 216. Mounted in the bottom of the counterbore 214 is a disc 234 which is centrally bored for the passage of the valve rod 224.

The lower end of the valve rod 224 is provided with a reduced diameter elongated pilot portion 236 joined to the upper part of the valve rod 224 by a tapered portion 238. The tapered portion 238 engages a valve seat 240 in a port 242 in the top of a radial boss 244 into a radial passageway 246 therein terminating in a chamber 248. A web 245 connects the end 247 of the boss 244 to the side wall of piston head member 210. The chamber 248 receives air, as in the motor 100, from a pressure fluid supply pipe 132 threaded into a port 130 in the cylinder wall 104, as before, by way of a conventional three-way valve (not shown) of the type described above.

The boss 244 extends across a cup-shaped recess 250 within the central piston head member 210, which is cup-shaped and welded at its upper rim in a stepped bore 252. The piston head member 210 also has a central recess 253 loosely receiving the pilot portion 236, with a clearance therebetween for admitting pressure fluid to the end 256 of the pilot portion 236 and also permitting proper valve seating. The piston head member 210, as before enters a cup-shaped recess 126 in the cylinder head 124 and engages a stop boss 128 therein.

The piston rod 204 is provided with a stop flange 254 immediately below the ports 152 and engageable with the lower end 121 of the skirt 118 at the upper limit of the stroke of the piston 206.

The operation of the further modified motor 200 of FIGURE 6 is generally similar to that of the motor 100 except that the action of the return air pressure regulating valve 212 is somewhat different because of its different construction. When the three-way valve (not shown) is shifted to admit compressed air or other suitable compressible pressure fluid to the pipe 132 and thence to the chamber 248 below the piston head flange 158 at the lower end of the cylinder bore 106, this pressure acts against the tapered portion 238 and also against the end 256 of the valve rod 224 to raise the tapered portion 238 of the valve rod 224 off its seat 240 in the port 242 against the downward thrust of the spring 226. Incoming compressed air from the pipe 132 then passes through the radial passageway 246 and port 242 into the inner return air storage chamber 148, whence it flows through the open ports 152 into the outer return air chamber 150, the latter being opened by pressure of the air against the valve band 164. When the pressure within the chambers 148 and 150 becomes slightly higher than the pressure of the incoming compressed air or other pressure fluid, due to the compression of the air in said chambers as the chamber 150 becomes smaller on the outward stroke of the piston, the pressure of the incoming air acting on the areas 238 and 256 pushes the valve rod 224 upward by overcoming the thrust of the spring 226. Thenceforth, this compressed air feeds back through the passages 242 and 246 into the chamber 248 to maintain a nearly equal pressure in all three chambers. This prevents a high back pressure against the outward travel of the piston 206.

Meanwhile, incoming pressure fluid, such as compressed air, has entered the recess 126 in the cylinder head 124 through the clearance provided between it and the central piston head portion 210 (FIGURE 6) and acts against the lower end of the piston head member 210 and also against the lower side of the piston head flange 158, causing the piston head 208 and tubular piston rod 204 of the piston 206 to move upward in a working stroke, carrying with it the parts attached at 218 to the upper end closure plug 216. When the ports 152 pass the ends 121 into the skirt 118, free flow of return air from the outer return air chamber 150 to the inner return air chamber 148 is interrupted, so that henceforth air cannot pass through the valve port 154 because of the pressure of the air in the outer return air chamber 150 against the valve band 164. As the piston head 208 rises, the air in the outer return air chamber 150 becomes further compressed, thereby providing a cushion effect at the end of the working stroke. The working stroke of the piston 206 terminates when the stop flange 254 on the tubular piston rod 204 engages the lower end 121 of the skirt 118.

To retract the piston 206, the operator, as before, shifts the conventional three-way control valve (not shown) to its venting position, thereby connecting the pipe 132 to the atmosphere. The air beneath the piston head 208 at the lower end of the cylinder bore 106 then escapes to the atmosphere, whereupon the valve 224 now closes due to the action of the spring 226, trapping the compressed air in the return air chambers 148 and 150, so that the compressed air in the return air chamber 150 acts against the upper side of the piston head flange 158 of the piston head 208 and moves the latter downward. This action causes the piston 206 to resume its retracted position shown in FIGURE 6, with the lower end of the piston head member 210 halted against the central stop boss 128. Meanwhile, the valve band 164 again serves to replenish any air lost by leakage from the return air chamber 150 after the ports 152 enter the skirt 181 in the manner previously described herein.

Figure 8:
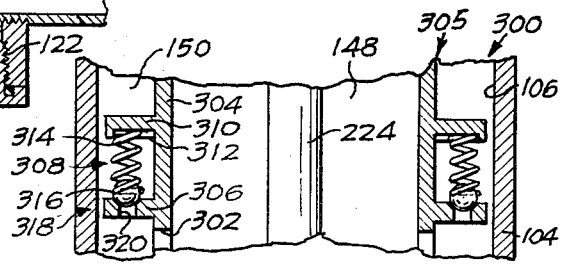
FIGURE 8 is a fragmentary central longitudinal section through a slight modification of FIGURE 6 employing ball check valves.

The still further modified pneumatically-retracted reciprocatory fluid pressure motor, generally designated 300, shown in fragmentary form in FIGURE 8 is similar in all respects to the motor 200 of FIGURES 6 and 7 except that the ports 302 in the tubular piston rod 304 of the piston 305 corresponding to the ports 154 in the tubular piston rod 204 are freely open and lie below an annular flange 306 extending radially and outward into close proximity to the cylinder bore 106 with a dashpot clearance space therebetween. The valve band 164 is replaced by ball check valves, generally designated 308, consisting of a radially-projecting spring abutment flange 310 spaced axially from the flange 306. The flange 310 is provided with spring abutment recesses or sockets 312 adapted to receive the upper ends of helical compression springs 314, the lower ends of which engage ball valve members 316 which are urged thereby into engagement with valve seats 318 located at the upper ends of ports 320 in the flange 306.

The operation of the still further modified motor 300 is generally similar to that described above for the motor 200, except that pressure fluid passes from the inner return air chamber 148 to the outer return air chamber 150 in a different manner. This air passes outward by way of the ports 320 after the pressure fluid has opened the ball check valves 308 by lifting their ball valve members 316 from their seats 318. The flange 306 and check valves 308 act as a dashpot device to prevent excessively fast motion of the piston 305 at the end of its upward working stroke.

The springs 82 (FIGURE 1), 188 (FIGURE 4) and 226 (FIGURE 6) have been found necessary because prolonged experience with and testing of pneumatic motors equipped with valves lacking such springs, such as with ball valve members, has shown that upon reversal of the air supply, such a ball valve member unassisted by a spring will not seat fast enough to prevent a great loss of air pressure from the return air chambers. Such loss of return air pressure, especially in small motors (colloquially called "cylinders" in industry) frequently leaves insufficient return air pressure to completely return the piston to its starting position or may return it sluggishly. The springs 82, 188 and 226 in the motor of the present invention close the ball or other valve almost instantaneously upon its seat with a snap action upon reversal of air supply to the service port of the motor.

What I claim is:

1. A reciprocatory pneumatic motor with pneumatic self-contained automatic piston return, said motor comprising a cylinder having opposite first and second end walls and having a cylinder bore with a pneumatic fluid service port near one end thereof and a working chamber adjacent said service port, a piston having a piston head reciprocable in said bore and a hollow piston rod extending from said piston head through said second end wall, said piston rod having an inner return air storage chamber therein and said cylinder having an outer return air chamber between said cylinder bore and said piston rod communicating with said inner return air chamber, said piston head having a fluid passageway extending therethrough from said working chamber to said return air storage chamber, and a one-way valve mounted on said piston and having a valve member movable between a closed position preventing fluid flow from said return air storage chamber to said working chamber and an open position effecting fluid flow from said working chamber into said return air storage chamber, said valve having a spring normally urging said valve member toward said closed position, said hollow piston rod having a port therein establishing communication between said outer and inner return air chambers and said second end wall having a closure portion entering into closing relationship with said piston rod port in response to the arrival of said piston rod at a predetermined location during its outer stroke, said piston rod having an annular portion extending into close proximity to said cylinder bore on the opposite side of said piston rod port from said second end wall.

2. A reciprocatory pneumatic motor with pneumatic self-contained automatic piston return, said motor comprising a cylinder having opposite first and second end walls and having a cylinder bore with a pneumatic fluid service port near one end thereof and a working chamber adjacent said service port, a piston having a piston head reciprocable in said bore and a hollow piston rod extending from said piston head through said second end wall, said piston rod having an inner return air storage chamber therein and said cylinder having an outer return air chamber between said cylinder bore and said piston rod communicating with said inner return air storage chamber, said piston head having a fluid passageway extending therethrough from said working chamber to said return air storage chamber, and a one-way valve mounted on said piston and having a valve member movable between a closed position preventing fluid flow from said return air storage chamber to said working chamber and an open position effecting fluid flow from said working chamber into said return air storage chamber, said valve having a spring normally urging said valve member toward said closed position, said piston rod having a unidirectionally-valved auxiliary port interconnecting said return air chambers.

3. A reciprocatory pneumatic motor, according to claim 1, wherein said passageway extends transversely of said piston, wherein a port extends axially from said passageway into said inner return air chamber, and wherein said valve member and spring are disposed in said passageway transversely of said piston head.

4. A reciprocatory pneumatic motor with pneumatic self-contained automatic piston return, said motor comprising a cylinder having opposite first and second end walls and having a cylinder bore with a pneumatic fluid service port near one end thereof and a working chamber adjacent said service port, a piston having a piston head reciprocable in said bore and a hollow piston rod extending from said piston head through said second end wall, said piston rod having an inner return air chamber therein and a piston end wall remote from said piston head, and said cylinder having an outer return air chamber between said cylinder bore and said piston rod communicating with said inner return air chamber, said piston head having a fluid passageway extending therethrough from said working chamber to one of said return air chambers, and a one-way valve mounted on said piston and having a valve member movable between a closed position preventing fluid flow from said one return air chamber to said working chamber and an open position effecting fluid flow from said working chamber into said one return air chamber, said valve having a spring normally urging said valve member toward said closed position, said piston rod end wall having a bore therein extending therethrough to the exterior thereof and said valve member having a piston rod end portion extending into said end wall bore in sliding sealed relationship therewith.

5. A reciprocatory pneumatic motor, according to claim 4, wherein said valve member end portion has a recess therein communicating with said end wall bore and wherein said spring is disposed within said recess in engagement with said second end wall.

6. A reciprocatory pneumatic motor, according to claim 2, wherein said auxiliary port is valved by a resilient band valve member extending at least partially around said piston rod.

7. A reciprocatory pneumatic motor, according to claim 1, wherein said annular piston rod portion has a port therethrough, and wherein a spring-pressed valve member yieldingly engages said annular piston rod portion port in normally closing relationship therewith.

References Cited in the file of this patent

UNITED STATES PATENTS

| 2,746,425 | Schafer | May 22, 1956 |

FOREIGN PATENTS

| 764,509 | France | Mar. 5, 1934 |
| 878,735 | France | Oct. 26, 1942 |